April 24, 1956  F. B. HALFORD ET AL  2,742,921
PROPELLENT INJECTOR VALVE FOR ROCKET MOTOR
Filed Dec. 27, 1949  2 Sheets-Sheet 1
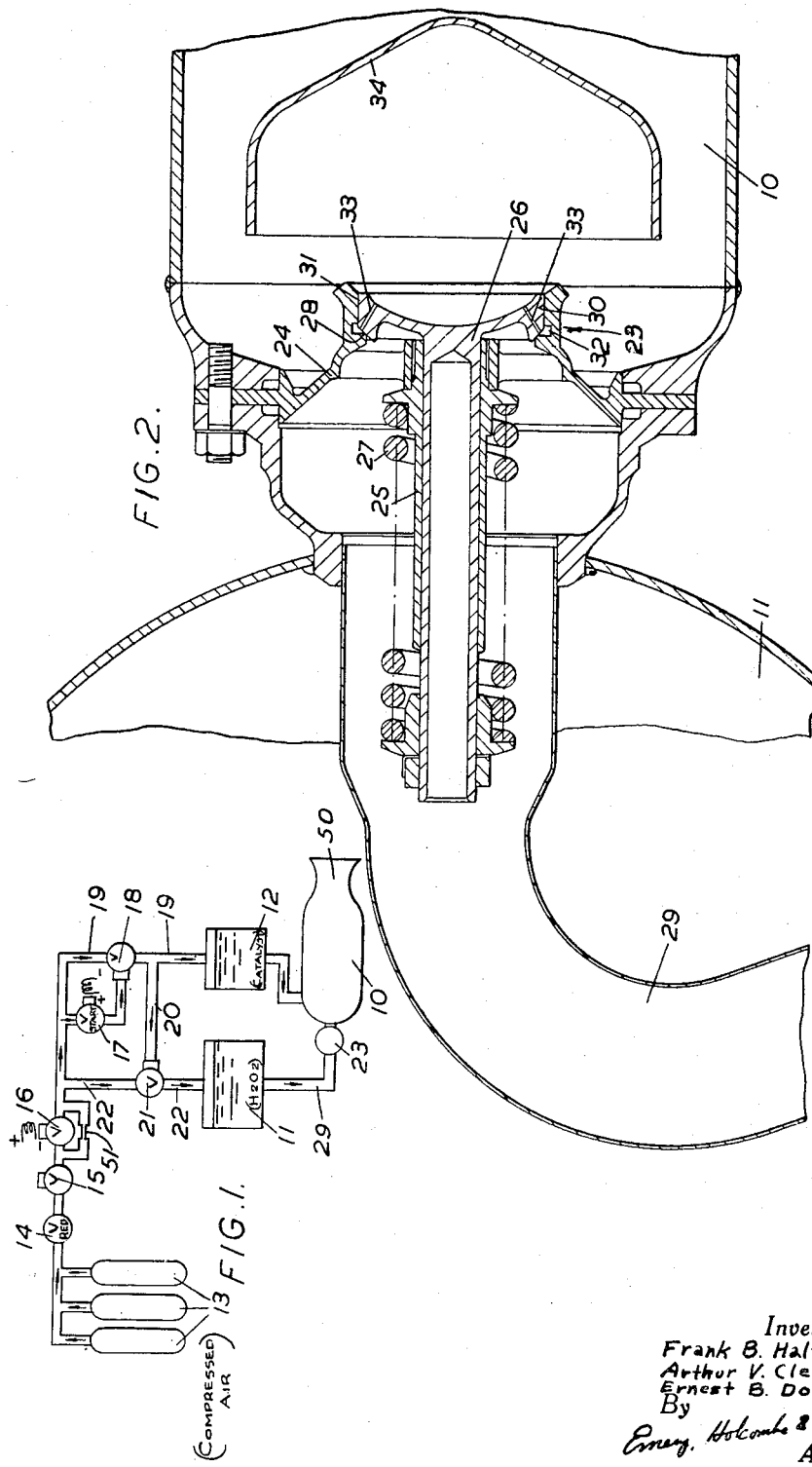
Inventor
Frank B. Halford
Arthur V. Cleaver
Ernest B. Dove
By
Emery, Holcombe & Blair
Attorney

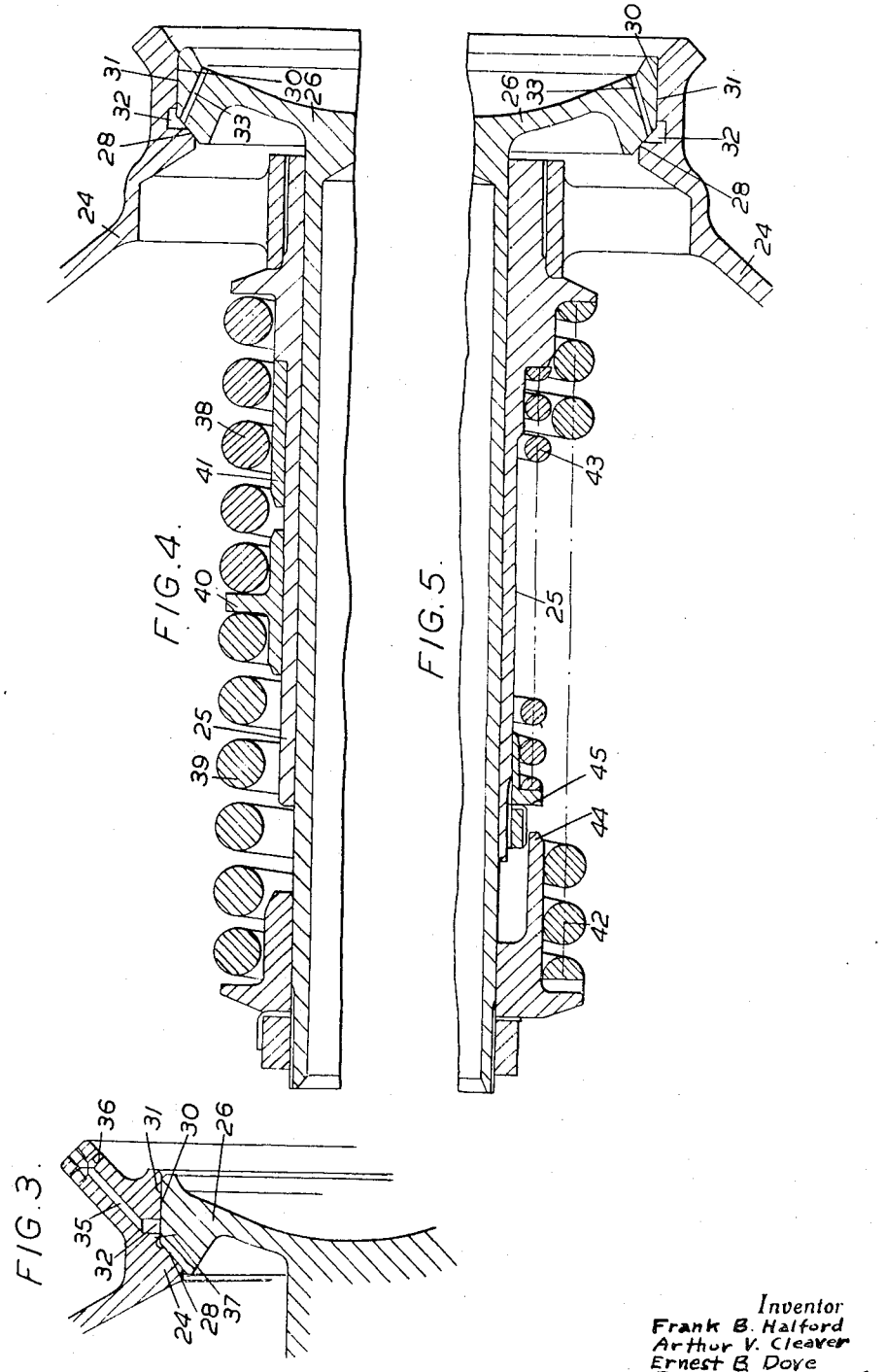

United States Patent Office 2,742,921
Patented Apr. 24, 1956

2,742,921

PROPELLENT INJECTOR VALVE FOR ROCKET MOTOR

Frank Bernard Halford, Edgware, Arthur Valentine Cleaver, London, and Ernest Baker Dove, East Barnet, England, assignors to The De Havilland Engine Company Limited, Stonegrove, Edgware, England, a company of Great Britain Application December 27, 1949, Serial No. 135,283

Claims priority, application Great Britain January 3, 1949

8 Claims. (Cl. 137—516.27)

This invention relates to a propellent injector valve for rocket propulsion apparatus of the kind wherein propellent liquid or liquids are injected into a reaction chamber in which a reaction takes place accompanied by the evolution of gases which issue from a nozzle with propulsive effect. It is an object of the invention to provide a propellent injector valve suitable for use in such apparatus and which will assist in providing a smooth start.

According to the present invention a propellent injector valve through which a propellent liquid is injected into the reaction chamber includes a movable valve member which in a closed position prevents propellent liquid from entering the reaction chamber, and which when moved progressively from this closed position towards a fully open position first exposes a passage or aperture of relatively small cross-sectional area, hereinafter termed the auxiliary passage, to admit propellent liquid to the reaction chamber at an initial rate which is below the normal rate, and thereafter exposes a passage or aperture of relatively large cross-sectional area, hereinafter termed the main aperture, to admit propellent liquid to the reaction chamber at the normal rate.

The movable valve member is urged towards the closed position by a spring or the equivalent disposed on the upstream side of the valve and towards the open position by the pressure of the propellent liquid behind it. Thus, when the pressure of the propellent liquid is low the valve will be closed, but when the pressure increases the valve will first move against the spring into some intermediate position in which the auxiliary passage is exposed so that propellent liquid can flow at the initial rate into the reaction chamber through this auxiliary passage. If the pressure of the propellent liquid is further increased the valve will be moved beyond the intermediate position into the open position, and so will open the main aperture thus allowing the propellent liquid to flow into the reaction chamber at the normal rate.

This arrangement can conveniently be employed for rockets of the kind in which the propellent liquids are pumped into the reaction chamber by compressed air or gas, since in such rockets the pressure of the propellent liquids can be easily controlled. By disposing the spring on the upstream side of the valve it is not directly exposed to the heat generated in the combustion chamber, and the cooling effect of the propellent liquid flowing past it prevents the spring from becoming overheated by conduction of heat back through the valve.

In one form of the invention the spring may be arranged so that its stiffness is greater when the movable valve member lies between the intermediate and open positions than when it lies between the closed and intermediate positions. The valve may also be arranged so that the movable member must move through a substantial portion, preferably a major portion, of its travel after it has exposed the auxiliary passage and before it opens the main aperture.

The construction of the injector valve may vary, but conveniently the movable valve member has a seating surface which engages a seat in the valve body when the valve member is in the closed position to prevent any propellent liquid from entering the reaction chamber, and a sliding sealing surface which engages a corresponding sealing surface of the valve body to prevent propellent liquid from passing through the main aperture when the valve member is in the intermediate position with only the auxiliary passage exposed.

In certain forms of the invention one or more auxiliary passages may be formed in the movable valve member with their inner ends lying between the seating surface and the sliding sealing surface. In other arrangements one or more auxiliary passages may be formed in the valve body with their inner ends lying between the seat for the movable valve member and the sealing surface, but in all these forms of the invention the auxiliary passages are so disposed as to project converging jets of propellant liquid into the reaction chamber. The auxiliary passages may be arranged so that the movable valve member must be raised an appreciable distance from its seat before they are exposed, and moreover the whole of one side of the movable valve member is subjected to the pressure of the propellent liquid before this liquid enters the auxiliary passage. It will of course be appreciated that auxiliary passages may be provided both in the movable valve member and in the valve body if desired.

The invention may be carried into effect in various ways, but four specific constructions of propellent injector valves as applied to a rocket unit intended for installation in or attachment to an aircraft for assisting its take off will be described by way of example with reference to the accompanying drawings, in which Figure 1 is a diagram of the general arrangement of the rocket unit, Figure 2 is a sectional elevation of one specific construction of propellent injector valve with auxiliary passages arranged in the valve head, Figure 3 is a fragmentary sectional elevation of an injector valve having auxiliary passages arranged in the body of the valve instead of in the valve head, Figure 4 is a fragmentary sectional elevation of an injector valve having two valve springs arranged in series, and Figure 5 is a fragmentary sectional elevation of an injector valve having two valve springs arranged in parallel.

The general arrangement and form of the rocket unit is described in United States Patent No. 2,634,577, dated April 14, 1953. Broadly speaking, and as indicated in Figure 1, it consists of a reaction chamber 10 into which can be injected a main propellent, for instance hydrogen peroxide, from a reservoir 11, and a secondary propellent, for instance sodium or calcium permanganate which acts as a dissociation catalyst for hydrogen peroxide, from a reservoir 12. The propellents are injected by compressed air which is stored in bottles 13.

The compressed air passes first through an automatic reducing valve 14 and then through an on-off or air release valve 15 to a solenoid operated check thrust valve 16. After leaving the check thrust valve it passes through a solenoid operated starting valve 17. When this starting valve is opened compressed air passes through it and opens a catalyst air distributor valve 18, which allows compressed air to flow through a pipe 19 and enter the catalyst reservoir 12 and so inject the catalyst into the reaction chamber 10. A portion of the compressed air which is passed through the catalyst air distributor valve 18 flows along a pipe 20 and opens a hydrogen peroxide air distributor valve 21, thus allowing compressed air to flow through a pipe 22 and enter the hydrogen peroxide reservoir 11, and so inject hydrogen peroxide into the reaction chamber 10 through the propellent injector valve 23, which is the subject of the present invention.

One form of propellent injector valve is shown in Figure 2, and consists of a valve body 24 arranged between the hydrogen peroxide reservoir 11 and the reaction chamber 10. This body carries a valve guide 25 in which can slide the stem of a poppet valve 26. A spring 27 disposed upstream of the poppet valve 26 holds this valve against a seating 28 in the valve body when the pressure exerted by the hydrogen peroxide on the poppet valve, and tending to lift it from the seating 28, is insufficient to overcome the force of the spring 27. When the poppet valve 26 is held against its seating in the closed position, as shown in the drawing, it prevents propellent liquid from passing from the reservoir 11 through the supply pipe 29 to the reaction chamber 10.

The poppet valve head carries a cylindrical skirt or sliding surface 30 which extends towards the reaction chamber 10 and which, when the valve is in the closed position as shown, wholly engages a corresponding cylindrical surface 31 in the valve body. There is an annular recess 32 in the valve body between the seating 28 and the cylindrical surface 31 which communicates with the inner end of some small bore passages 33, referred to as auxiliary passages, which pass through the head of the poppet valve 26.

When the pressure on the surface of the hydrogen peroxide in the reservoir 11 is atmospheric, or thereabouts, the valve spring 27 will hold the poppet valve firmly on its seating 28 in its closed position and so will prevent any hydrogen peroxide from entering the reaction chamber 10. If now the compressed air supply is turned on, compressed air will be applied to the hydrogen peroxide in the reservoir 11 at an increasing pressure so that it will exert an increasing force on the poppet valve in opposition to the force exerted by the spring 27. Initially this force is only sufficient to move the poppet valve a short distance from its seating 28, thus allowing hydrogen peroxide to enter the annular recess 32 and thence to issue through the auxiliary passages 33 into the reaction chamber 10. The small size of the auxiliary passages 33 only permits a small flow of hydrogen peroxide to enter the reaction chamber initially and so ensures a smooth start.

As the compressed air pressure in the hydrogen peroxide reservoir builds up, a considerably greater force is applied to the poppet valve in opposition to the spring 27. This will move the poppet valve so far off its seating that the cylindrical skirt 30 of the valve head will pass beyond the corresponding sealing surface 31 of the valve body, leaving an annular aperture of substantial cross section for the passage of hydrogen peroxide into the reaction chamber. This cross section increases until the poppet valve has been moved into its fully opened position. There will thus be a substantially increasing flow of hydrogen peroxide, and the normal take-off thrust will be developed when the poppet valve is fully open and the hydrogen peroxide is flowing into the reaction chamber 10 at the full or normal rate.

In order to prevent a jet of undissociated hydrogen peroxide from being projected straight through the reaction chamber 10 and out of the nozzle 50, a baffle 34 is provided in front of the head of the poppet valve 26.

In the construction shown in Figure 3, auxiliary passages 35 and 36 are arranged in the valve body 24 instead of in the poppet valve head, and a cylindrical land 37 is left between the valve seating 28 and the annular recess 32 from which the auxiliary passages 35 issue. With this arrangement the poppet valve 26 must be lifted from its seating by a distance equal to the width of the cylindrical land 37 before the hydrogen peroxide can enter the annular recess 32 and pass through the auxiliary passages 35 and 36.

In another construction, shown in Figure 4, two valve springs 38 and 39 are provided which are disposed upstream of the poppet valve 26 and arranged in series around the valve guide 25 with a sliding abutment 40 between them. The arrangement is such that when the poppet valve 26 moves towards an intermediate position from its closed position both the springs 38 and 39 are in action, and are comparatively resilient. In other words they have a relatively low stiffness. As soon as the valve has reached the intermediate position the sliding abutment 40 comes up against a stop 41, thus leaving only the spring 39 in operation. The stiffness of a single spring is considerably greater than that of two springs in series, so that the force required to move the poppet valve from the intermediate to the open position is considerably greater than that required to move it from the closed to the intermediate position.

In the construction shown in Figure 5 there is a main spring 42 which is progressively compressed as the poppet valve 26 moves from the closed to the open position, and an auxiliary spring 43 is brought into operation in parallel with the main spring 42 when the valve moves from an intermediate position towards the open position. This is brought about by an abutment 44, which moves with the valve 26, coming into contact with a sliding abutment 45 for the spring 43 after the valve 26 has moved through a predetermined distance into its intermediate position. Thus the hydrogen peroxide pressure must be considerably greater to move the valve 26 from the intermediate to the open position than to move it from the closed position to the intermediate position.

The invention is applicable to rocket propulsion apparatus having a control system as described in United States patent specification Serial No. 135,284, filed December 27, 1949, in the names of Frank Bernard Halford and Arthur Valentine Cleaver.

The control system described in that specification is so arranged that for testing or checking purposes all the valves in the apparatus can be made to function as they would in normal operation, but only so as to permit a considerably reduced flow of propellents so that the thrust produced by the unit when testing will not be unnecessarily high, the check thrust valve 16 being provided with a small auxiliary passage 51 which is always open for this purpose. To this end it is also necessary to ensure that, when testing, the hydrogen peroxide injector valve will only allow a relatively small flow of hydrogen peroxide into the reaction chamber, and the injector valve of the present invention fulfills this requirement.

Although the invention has been particularly described in relation to rocket units for the assisted take-off of aircraft, it will be appreciated that it is also applicable to rockets intended for other purposes. Other propellents may also be employed.

What we claim as our invention and desire to secure by Letters Patent is:

1. A propellant injection valve for injecting propellant into the reaction chamber of a rocket propulsion apparatus comprising a stationary valve body containing a tubular flow passage, annular valve-engaging means disposed at an intermediate point in the flow passage and including a cylindrical part for sliding engagement and a seating part axially displaced from one another along the said flow passage, said seating part being upstream of said sliding part, a movable valve member having a cylindrical part which, when the valve is in and near its closed position, has an area of sliding engagement with the said cylindrical part of the said valve-engaging means, but when such valve member is in its fully open position has no such area of sliding engagement, and a seating which engages the said seating part when the valve is in its closed position, the valve member being urged towards its open position by the pressure of the propellant behind it, spring means urging the valve member towards its closed position, and a plurality of auxiliary passages of relatively small cross-sectional area of flow by-passing said area of sliding engagement and converging towards their ends to form a stream coaxial with said tubular flow passage permitting uniform injection of propellant in restricted volume suitable for combustion when the said valve member occupies a range of positions in which the said seating is out of engagement with said seating part but said cylinder parts are in sliding engagement.

2. A propellent injector valve as claimed in claim 1, in which the auxiliary passages are formed in the movable valve member.

3. A propellent injector valve as claimed in claim 1, in which the auxiliary passages are formed in the valve body.

4. A propellant injector valve as claimed in claim 1, in which said auxiliary passages are formed in said valve body adjacent said valve-engaging means.

5. A propellant injector valve for injecting propellant into the reaction chamber of a rocket propulsion apparatus comprising a stationary valve body having at opposite ends axially disposed inlet and discharge openings of large cross-sectional area of flow, a movable valve member in said body which is urged towards an open position by the pressure of the propellant behind it, spring means disposed upstream of said movable valve member and urging said valve member towards a closed position, a seating in said body adjacent to its upstream end which receives said valve member when the latter is in closed position, an auxiliary passage opening downstream of said seating and discharging through said discharge opening, said auxiliary passage being of relatively small cross-sectional area of flow and discharging upstream towards the axis of said valve, thereby permitting uniform injection of propellant in restricted volumes and direction of flow suitable for combustion when said valve member is in an intermediate range of positions but which is closed by said seating when said valve member is in closed position, and sealing means associated with said valve member downstream of said auxiliary passage opening which blocks off a main passage of relatively large cross-sectional area of flow leading to said discharge opening when said valve member is in said intermediate range of positions but unblocks said main passage permitting injection of a large volume of propellant when said valve member is in open position.

6. A propellant injector valve for rocket propulsion apparatus including a reaction chamber and at least one pressure reservoir for propellant, together with means for transferring said propellant from the reservoir into the reaction chamber and control means for regulating the rate of injection of propellant to conform to either of not less than two rates of operation of said apparatus, said propellant injector valve comprising two principal valve parts including a stationary valve body and a movable valve member therein, said valve body having a single inlet passage and a single outlet passage of large cross-sectional area of flow discharging in a generally axial direction upstream and a seating separating said passages which receives said valve member in closed position of the valve to block said outlet passage, said valve member being urged towards an open position unblocking said outlet passage by the pressure of the propellant behind it, spring means disposed upstream of said movable valve member and urging said valve member towards the closed position, one of said valve parts having a plurality of auxiliary passages downstream of said seating of relatively small cross-sectional area of flow converging towards their upstream ends and serving to connect said inlet and outlet passages in an intermediate position of said valve member and which passages are blocked by said valve member in closed position, said valve member having sealing means associated therewith which blocks said outlet passage in a range of intermediate positions including such wherein said auxiliary passages are unblocked thereby, said sealing means being positioned between the inlet passage end and the outlet passage end of said auxiliary passages, whereby movement of said valve member into an intermediate position permits propellant to flow through said auxiliary passages around said sealing means at a predetermined rate and to discharge therefrom in converging streams.

7. A propellant injector valve as claimed in claim 6 in which said auxiliary passages are formed in said valve member.

8. A propellant injector valve as claimed in claim 6 in which said auxiliary passages are formed in said valve body.

References Cited in the file of this patent

UNITED STATES PATENTS

| | | |
|---|---|---|
| 487,029 | Gray et al. | Nov. 29, 1892 |
| 525,963 | McNeil | Sept. 11, 1894 |
| 586,779 | Neumeyer et al. | July 20, 1897 |
| 1,032,482 | Jerauld | July 16, 1912 |
| 1,035,938 | Anderson | Aug. 20, 1912 |
| 1,271,541 | Core et al. | July 9, 1918 |
| 1,665,850 | Hargreaves | Apr. 10, 1928 |
| 1,705,942 | Moody | Mar. 19, 1929 |
| 1,774,690 | Willoughby | Sept. 2, 1930 |
| 1,813,078 | Nyrop | July 7, 1931 |
| 1,884,548 | Boynton | Oct. 25, 1932 |
| 2,165,611 | Campbell | July 11, 1939 |
| 2,434,298 | Truax | Jan. 13, 1948 |
| 2,505,798 | Skinner | May 2, 1950 |
| 2,518,387 | Shaw | Aug. 8, 1950 |

FOREIGN PATENTS

| | | |
|---|---|---|
| 342,548 | Great Britain | Feb. 5, 1931 |
| 491,741 | Germany | Feb. 12, 1930 |